Patented Dec. 26, 1950

2,535,747

UNITED STATES PATENT OFFICE 2,535,747

SUBSTITUTED HEXAHYDROPYRIMIDINES AND METHOD FOR PRODUCING THEM

Glen H. Morey, Terre Haute, Ind., assignor to Commercial Solvents Corporation, Terre Haute, Ind., a corporation of Maryland No Drawing. Application August 28, 1948, Serial No. 46,725

5 Claims. (Cl. 260—251)

My invention relates to the production of substituted hexahydropyrimidines and a method for producing them. More particularly, it relates to the reaction of formaldehyde, benzaldehyde or acetophenone with a diamine one nitrogen of which is primary and the other secondary, to produce a compound having the following structure:

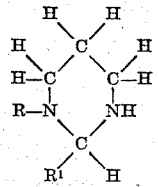

wherein R is a substituent group selected from the class consisting of alkyl and hydroxyalkyl, and $R^1$ is a substituent group selected from the class consisting of hydrogen and phenyl.

As examples of the new compounds included in the above formula may be mentioned: 1-(2-ethylhexyl)hexahydropyrimidine, 1-(2-hydroxyethyl)hexahydropyrimidine, 1-isopropyl-2-phenylhexahydropyrimidine, and 1-isopropyl-2-methyl-2-phenyl-hexahydropyrimidine.

Compounds of the above character may be produced by reacting approximately equimolecular proportions of formaldehyde, benzaldehyde or acetophenone with a diamine having the following general structure:

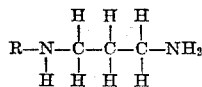

wherein R is a substituent group selected from the class consisting of alkyl and hydroxyalkyl.

The process is carried out by reacting one mole of diamine with not substantially more than one mole of formaldehyde, benzaldehyde or acetophenone at a temperature below about 125° C. until condensation is substantially complete. The reaction is exothermic in character and in general may be initiated at a temperature of about 25 to 50° C. In many instances it may be necessary or desirable to cool the reaction vessel in order to control the reaction by maintaining the temperature in the range of about 30–50° C. Atmospheric pressure is generally employed.

A suitable solvent which is inert under the conditions of the reaction may be used for maintaining the reactants in solution while the reaction is being carried out. Examples of satisfactory solvents include methanol and other monohydric alcohols. In general, solvents which do not enter into the reaction or react with any products thereof may be employed.

The diamines used in my process include N-isopropyl-1,3-propanediamine, N-(2-ethylhexyl)-1,3-propanediamine, N-(beta-hydroxyethyl)-1,3-propanediamine, and the like.

In order to obtain the N-substituted hexahydropyrimidines of my invention it is necessary that one of the amino groups of the diamine employed in the reaction be primary and the other secondary. If both amino groups are primary, resinous, tarry substances of little or no utility will be formed. Contrary to what might be expected from results with primary diamines, the primary amino groups of the diamines used in my invention do not form resinous or tarry products. The reaction is controlled and products of useful, novel character are obtained. Moreover, the yields of the desired products are high.

The new products produced by my novel reaction may be used, for example, in the preparation of wetting agents by converting them to the lauric or oleic salts or to quaternary ammonium salts. The reaction product with formaldehyde, for example, may be used in the production of plastics, for example, by reaction with phenol.

The following examples are given to illustrate my invention but should not be construed as limiting it to the exact conditions or reactants shown.

Example I

Two hundred thirty-three grams (1.28 moles) of N-(2-ethylhexyl)-1,3-propanediamine were placed in a beaker and 30 grams (one mole) of formaldehyde in 40% aqueous solution added portionwise while stirring and maintaining the temperature at 45–50° C. by cooling. After the reaction was complete the more volatile constituents were distilled off to a pot temperature of 130° C. The product was then fractionated at 10 mm. of mercury pressure, giving 194 grams of N-(2-ethylhexyl)hexahydropyrimidine boiling at 120–121° C.

Example II

Two hundred six grams (1.745 moles) of N-(beta-hydroxyethyl)-1,3-propanediamine were placed in a beaker along with 100 cc. of methanol. Then 51 grams (1.7 moles) of formaldehyde in 40% aqueous solution was added portion-wise while stirring and maintaining the temperature at 45–50° C. by cooling. The mixture was finally heated for ½ hour on the steam bath. The methanol and other volatile constituents were then distilled off at atmospheric pressure to a pot temperature of 120° C. The product was distilled at 2 mm. mercury pressure and yielded 209 grams of N-(beta-hydroxyethyl)hexahydropyrimidine.

*Example III*

One mole (116 grams) of N-isopropyl-1,3-propanediamine was placed in a beaker. To this was then added dropwise one mole (106 grams) of benzaldehyde while stirring and maintaining the temperature around 35° C. by cooling. The solution was finally heated for ½ hour on the steam bath and the water formed in the reaction removed by azeotropic distillation with benzene. After removing the benzene by distillation the resulting product distilled at 2 mm. mercury pressure. A yield of 158 grams of N-isopropyl-2-phenylhexahydropyrimidine was obtained.

*Example IV*

A mixture of 34.8 grams (0.3 mole) of N-isopropyl-1,3-propanediamine, 36 grams (0.3 mole) of acetophenone and a little benzene was heated to remove the water formed through a 4 ft. packed column. The temperature was gradually increased from 120° C. to 180° C. during a 6 hour period. Five grams of H₂O collected. The product was distilled at 173°–175° C. at 20 mm. and yielded 37 grams of 1-isopropyl-2-methyl-2-phenyl-hexahydropyrimidine.

I claim as my invention:

1. As new compositions of matter, N-substituted hexahydropyrimidines having the general structure:

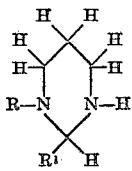

wherein R is a substituent group selected from the class consisting of alkyl and hydroxyalkyl, and R¹ is a substituent group selected from the class consisting of hydrogen and phenyl.

2. As a new composition of matter, 1-(2-ethylhexyl)hexahydropyrimidine.

3. As a new composition of matter, 1-(beta-hydroxyethyl)hexahydropyrimidine.

4. As a new composition of matter, 1-isopropyl-2-phenylhexahydropyrimidine.

5. A process for preparing N-substituted hexahydropyrimidines which comprises reacting in substantially equimolecular proportions and at a temperature below about 125° C., a carbonyl compound, selected from the group consisting of formaldehyde, benzaldehyde and acetophenone, with a diamine of the following general formula:

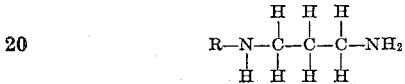

wherein R is a substituent group selected from the class consisting of alkyl and hydroxyalkyl.

GLEN H. MOREY.

REFERENCES CITED

The following references are of record in the file of this patent:

UNITED STATES PATENTS

| Number | Name | Date |
| --- | --- | --- |
| 1,885,509 | Byers | Nov. 1, 1932 |

OTHER REFERENCES

Titherley et al.: J. Chem. Soc., 103, 331–334.